(12) United States Patent
Dettinger

(10) Patent No.: US 7,114,001 B2
(45) Date of Patent: Sep. 26, 2006

(54) PREDICTIVE NETWORKING

(75) Inventor: Richard Dean Dettinger, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 730 days.

(21) Appl. No.: 09/853,957

(22) Filed: May 11, 2001

(65) Prior Publication Data

US 2002/0169824 A1    Nov. 14, 2002

(51) Int. Cl.
| | |
|---|---|
| G06F 15/16 | (2006.01) |
| G06F 17/30 | (2006.01) |
| H04L 12/56 | (2006.01) |
| H04L 12/54 | (2006.01) |

(52) U.S. Cl. ............ 709/232; 709/203; 370/395; 370/429; 707/2; 707/3; 707/5; 707/200

(58) Field of Classification Search ........... 709/232, 709/203; 711/114; 712/239; 395/200.62; 707/3, 200, 2, 5
See application file for complete search history.

(56) References Cited

U.S. PATENT DOCUMENTS

| | | | |
|---|---|---|---|
| 5,758,087 A * | 5/1998 | Aaker et al. ............. | 709/232 |
| 5,787,460 A * | 7/1998 | Yashiro et al. ............. | 711/114 |
| 5,878,223 A | 3/1999 | Becker et al. .......... | 395/200.53 |
| 5,918,224 A * | 6/1999 | Bredenberg ................ | 707/2 |
| 5,930,252 A * | 7/1999 | Aaker et al. .............. | 370/395.2 |
| 6,230,260 B1 * | 5/2001 | Luick .......................... | 712/239 |
| 6,275,830 B1 * | 8/2001 | Muthukkaruppan et al. .............. | 707/200 |
| 6,483,845 B1 * | 11/2002 | Takeda et al. .............. | 370/429 |
| 6,629,095 B1 * | 9/2003 | Wagstaff et al. .............. | 707/5 |
| 6,718,322 B1 * | 4/2004 | Brye .......................... | 707/3 |
| 6,748,378 B1 * | 6/2004 | Lavender et al. .............. | 707/5 |

* cited by examiner

*Primary Examiner*—Bunjob Jaroenchonwanit
*Assistant Examiner*—Philip C. Lee
(74) *Attorney, Agent, or Firm*—Patterson & Sheridan, LLP

(57) ABSTRACT

A method and system for predicting server database requests by a client. A database contains a plurality of command sets likely to be sent by a client to a server. The server compares statements received from the client with command sets stored in the database. If the server recognizes a pattern with a command set stored in the database, the server predicts that the client will send this command set and executes the statements contained therein.

28 Claims, 4 Drawing Sheets

PREDICTIVE NETWORKING

BACKGROUND OF THE INVENTION

1. Field of the Invention

The present invention generally relates to distributed computer networks and more specifically to a method and system for improving data transfer between a client and server computer.

2. Description of the Related Art

Due to the prevalence of distributed computer networks and development of mass storage and low priced disk devices, database systems of the server-client form have recently increased. Generally, a distributed computer system comprises a collection of loosely coupled machines (mainframe, workstations or personal computers) interconnected by a communication network.

Through a distributed computer system, a user or client may access various servers to store information, print documents, access databases, acquire client/server computing or gain access to the Internet. These services often require software applications running on the user's desktop to interact with other applications that might reside on one or more remote machines. Thus, in a client/server computing environment, one or more clients and one or more servers, along with the operating system and various inter-process communication (IPC) methods or mechanisms, form a composite that permits distributed computation, analysis and presentation.

In a typical distributed computer network, many clients are simultaneously coupled to the server. Server database requests by the many clients may occur concurrently thereby slowing the transmission of data to each of the clients. Conventionally, when a client issues a database request to the server, the server must wait until it receives all of the statements in the database request before it can start processing the request. This results in wasted processing time and creates unnecessary overhead in the network.

Therefore, there is a need for a method and system that allows a server to service client requests more efficiently and reduce the overhead time associated with servicing requests.

SUMMARY OF THE INVENTION

The embodiments generally relate to the transfer of information over computer networks and in particular to the transfer of information between a client and server computer. Still more particularly, the embodiments relate to a method of optimizing the transfer of information between a client and server by predictively completing a task not yet explicitly requested by the client.

In one embodiment a method and system is provided for predicting server requests from a client. The server comprises a database of commands likely to be sent by the client. The server receives a portion of a command from the client and determines whether a matching command exists in the database of commands. If a match is found, the server executes the matched command. The server then receives the remaining portion of the client command and determines if the matched command matches the client command. If so, the server sends the results to the client.

In another embodiment, the server and client comprise an identical database of commands likely to be sent by the client. The server receives a portion of a command from the client and determines whether a matching command exists in the database of commands. The server and the client determine if a matching command exists in the database of commands. If so, the server executes the matched command and sends the results to the client.

In still another embodiment, the server builds a database of commands likely to be sent by a client. The database of commands are commands recognized by the server as likely to repeat by a particular client user or client application. The server receives a command from the client and determines if the command had been previously sent. If so, the server stores the command in the database.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
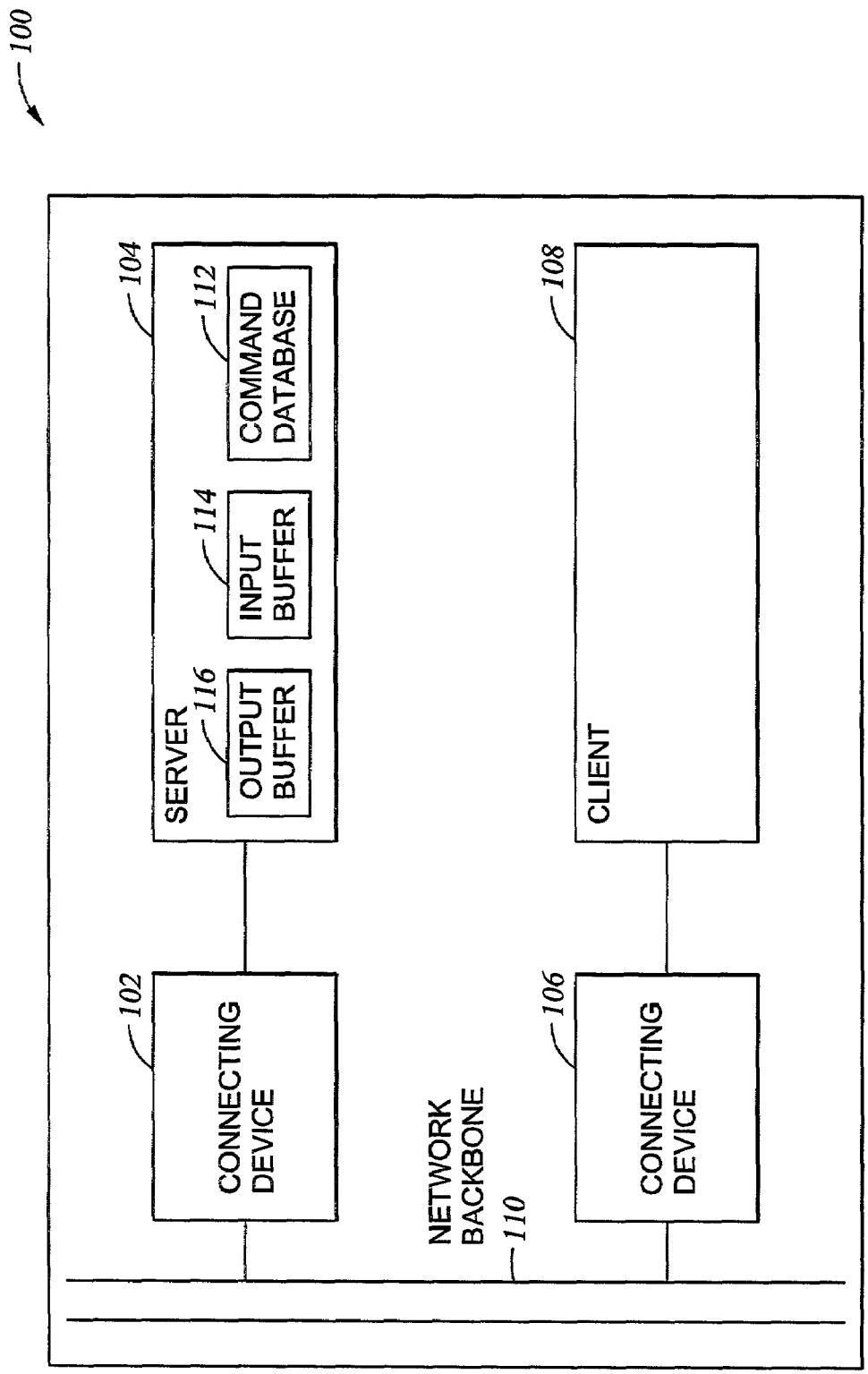
FIG. 1 is block diagram of a network environment comprising a server and a client.

The embodiments provide a method and system to predict requests of a server, by a client, in a computer network environment. In many cases, server requests are predictable because they must follow strict construction rules set forth by the application program interface (API) used by the client and server. Anticipating a client request significantly improves overall network speed. In one embodiment, a client sends a database request to the server by sequentially sending each statement in the request. The sever collects the statements sent by the client and determines if it can recognize a pattern in the database request. If the server is able to predict the remaining statements in the database request, the server executes the predicted database request.

In another embodiment, the server predicts the behavior of the client while the client, using the same prediction method as the server, generates the same prediction as the server. As an illustration, the client prepares a database request and sequentially sends the database request statements to the server. When the server recognizes a pattern of statements sent by the client, the server executes a predicted command set and sends the results to the client. Because the client executes the same predictive method in tandem with the server, the client can determine whether and when the server has correctly predicted subsequent statements. Since the client knows how the server will predict its behavior, the client waits for the results from the server without sending the remaining statements in the database request.

In still another embodiment, the server keeps track of requests made upon it by a client application so that it can predict future behavior based on past usage. As an illustration, each application executed by a client develops unique repetitive patterns of requests made upon a server. The server stores these patterns for use in predicting the future behavior of the client's applications. When the server recognizes a predicted pattern, the server executes the predicted request and sends the results to the client.

One embodiment is described in the general context of computer-executable instructions, such as program modules, being executed by a computer, such as a personal computer, for example. Generally, program modules include routines, programs, objects, components, data structures, etc. that perform particular tasks or implement particular abstract data types.

The program modules that define the functions of the present embodiments may then be placed on a signal-bearing medium to provide a signal-bearing medium. The signal bearing media, include, but are not limited to, (i) information permanently stored on non-writable storage media, (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

Moreover, those skilled in the art will appreciate that embodiments may be practiced with any variety of computer system configurations including hand-held devices, multi-processor systems, microprocessor-based or programmable consumer electronics, network PCS, minicomputers, mainframe computers and the like. The embodiment may also be practiced in distributed computing environments where tasks are performed by remote processing devices that are linked through a communications network. In a distributed computing environment, program modules may be located in both local and remote memory storage devices.

FIG. 1 illustrates a block diagram of a networked computer system 100. The system 100 comprises a client computer 108 and a server computer 104. In one embodiment, client computer system 108 connects to a network 110 by means of a connecting device 106. Also connected to the network 110 are one or more server computers 104 connected by means of their own connecting device 102. Those skilled in the art will appreciate that these connecting devices may take various forms, including modems, token-ring hubs, Ethernet hubs and other network enabling devices. The server 104 includes an area of system memory and/or disk storage space dedicated to storing and maintaining a predicted command database 112. The server memory also includes an input buffer 114 and an output buffer 116. Although only one client computer 108 is shown, any number of client computers may be connected to the network 110.

Figure 2:
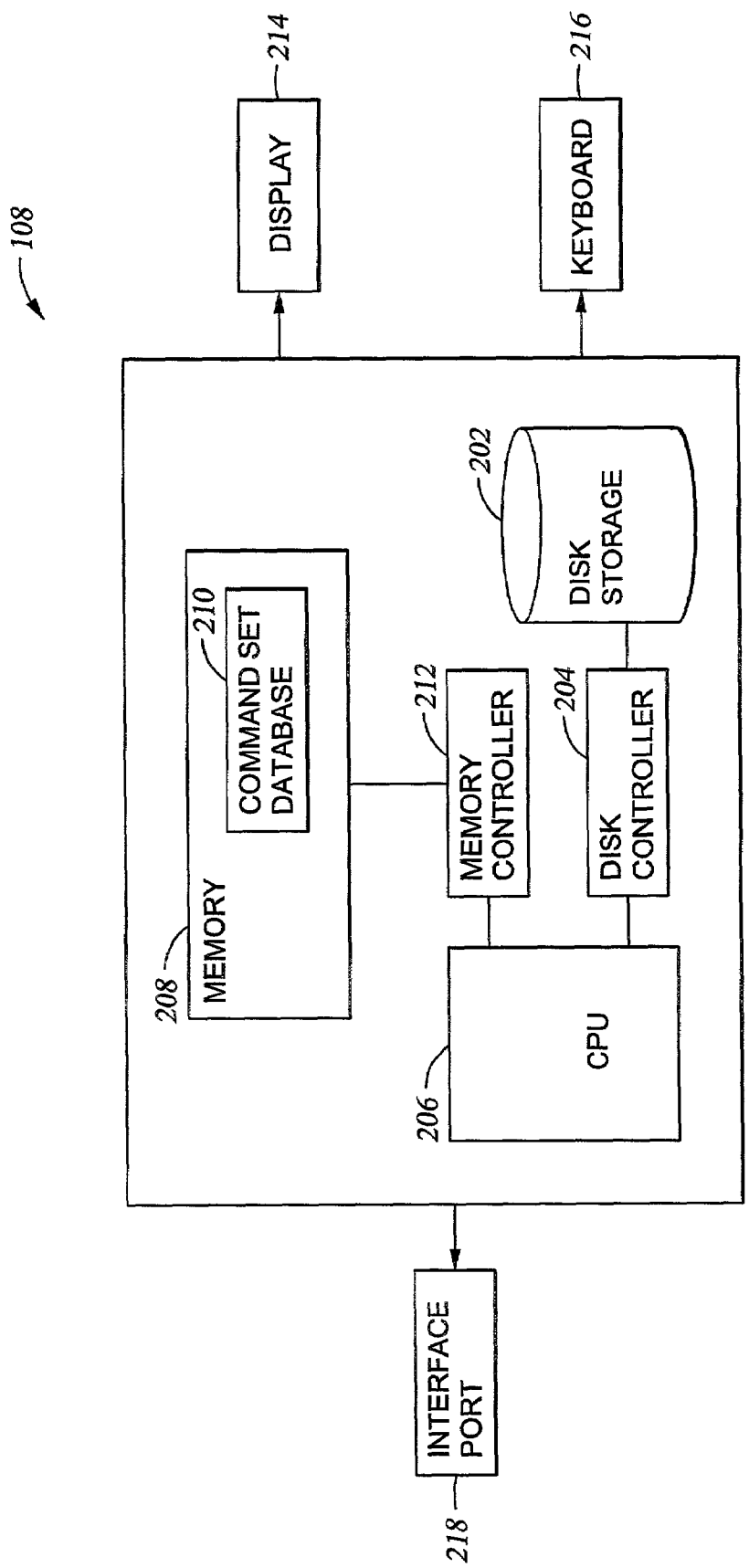
FIG. 2 is a block diagram of an illustrative client computer system.

FIG. 2 shows an illustrative embodiment of the client computer system 108. In one embodiment, the client computer system 108 includes a central processing unit (CPU) 206, a memory controller 212, system memory 208, disk storage 202, and a disk storage controller 204. Illustratively, the system 108 includes a display 214, a keypad 216 and an interface port 218. Illustratively, the interface port 218 may be a serial or parallel communications port that allows the client 108 to be connected to a network connecting device 102. A portion of the system memory 208 is set aside for a command set database 210. The command set database 210 stores sets of commands commonly used by the client when making requests of a server database.

Figure 3:
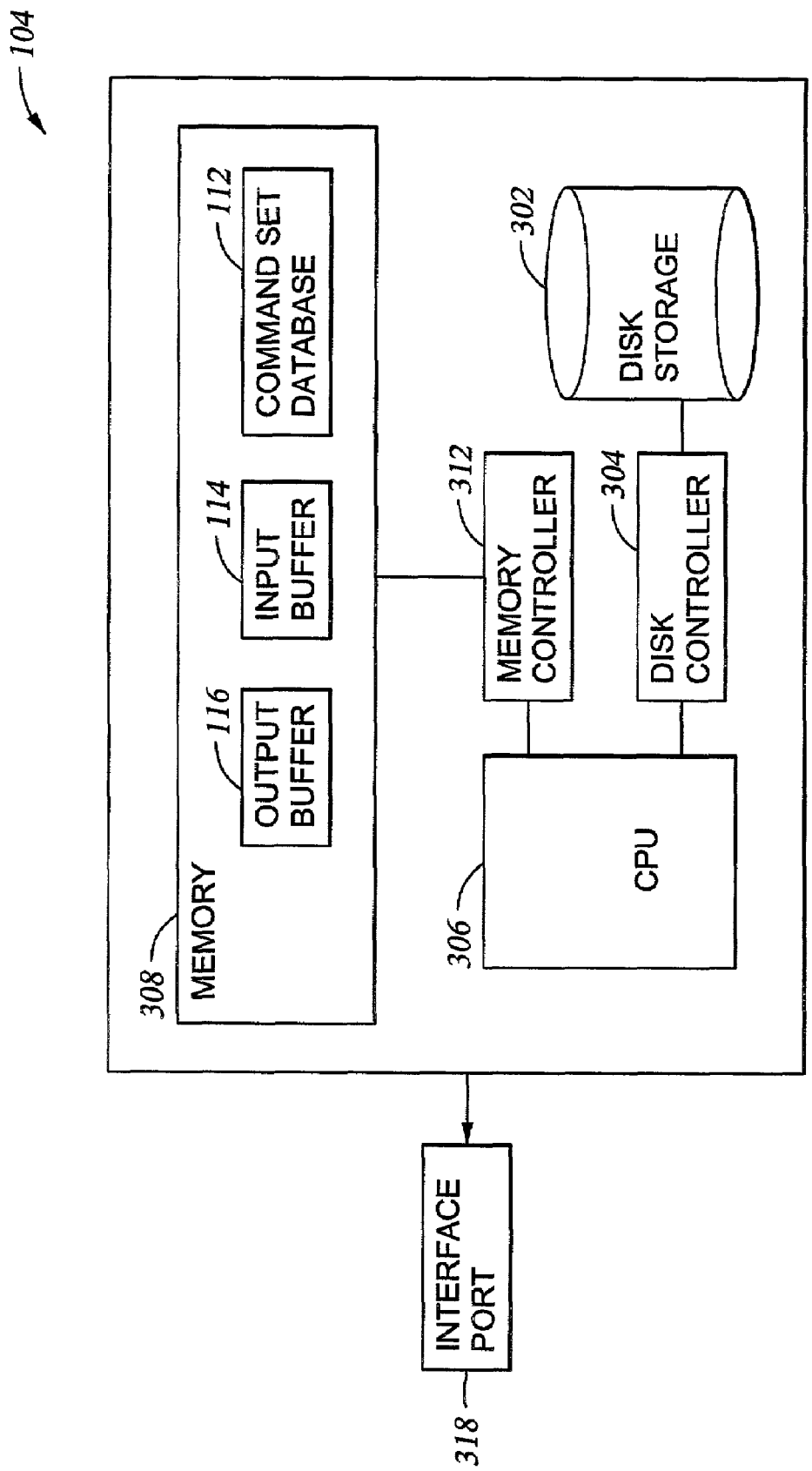
FIG. 3 is a block diagram of an illustrative server computer system.

FIG. 3 shows an illustrative embodiment of the server computer system 104. In one embodiment, the server computer system 104 includes a central processing unit (CPU) 306, a memory controller 312, system memory 308, disk storage 302, a disk storage controller 304, and an interface port 318. Illustratively, the interface port 318 may be a serial or parallel communications port that allows the server 104 to be connected to a network connecting device 102. A portion of the system memory 308 is set aside for the command set database 112, the input buffer 114 and the output buffer 116. The command set database 112 stores sets of commands commonly used by a client when making requests of a server database. The input buffer 114 is a memory area used to store commands received from the client. The output buffer 116 is a memory area used to store the results of an executed command set received from the client 108.

Figure 4:
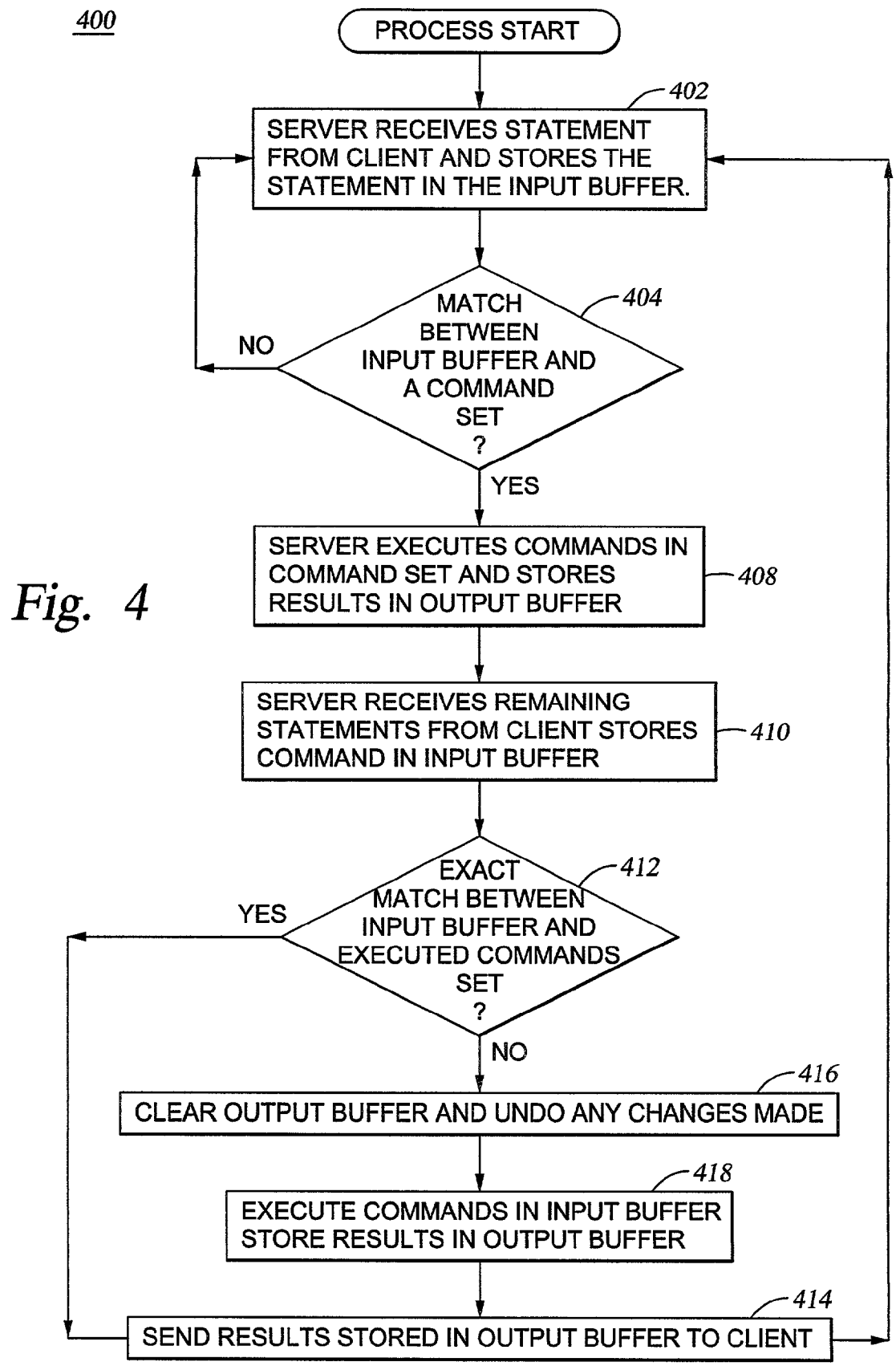
FIG. 4 is a flow chart illustrating a method for predicting a command set.

One embodiment illustrating a method of predicting a client request of a server is shown as a method 400 in FIG. 4. In one embodiment, the method 400 may be understood as illustrative of the operation of the system 100. Therefore, reference is occasionally made to FIG. 1, FIG. 2 and FIG. 3. The method 400 is entered at step 402 where the server 104 receives one of a plurality of statements in a command set. The statements are stored in the input buffer 114. After each statement is received, the method 400 proceeds to step 404.

At step 404, the method 400 compares the sequence of statements contained in the input buffer 114 with command sets stored in the command set database 112 and queries if a match is found. The command set database 112 contains sets of statements representing routine service requests. The sequence of statements received in the input buffer 114 are matched against statements in the command set database 112. If there is not a match with a command set, the method proceeds back to step 402 to receive further statements from the client. If there is a match, the method 400 proceeds to step 408.

At step 408, the server executes the statements in the command set that were matched in step 404. The results of the executed command set are stored in the output buffer 116. The method then proceeds to step 410.

At step 410, the server 104 receives the remaining statements from the client. The statements are stored in the input buffer 114 and are combined with the statements previously received to form a complete service request. The input buffer 114 now contains all of the statements in the command set sent by the client. The method then proceeds to step 412.

At step 412, the server compares the command set sent by the client, stored in the input buffer 114, with the command set executed in step 408. If the command sets are identical, the server has successfully predicted the behavior of the client by preparing the results of the client request prior to receiving the complete set of command statements from the client. In this case, the method 400 proceeds to step 414. If the command sets are not identical, the sever has not successfully predicted the behavior of the client and the method 400 proceeds to step 416.

At step 416, the server clears its output buffer and undoes any changes made to its database as a result of executing the command set in step 404. This occurs because the server has not correctly predicted the behavior of the client and must restore its database to a state prior to executing the command set performed in step 408. The method 400 proceeds to step 418.

At step 418, the server executes the service request command set sent by the client stored in the input buffer. The results of executing the client service request are stored in the output buffer 116. The method 400 proceeds to step 414.

At step 414 the server sends the results stored in the output buffer to the client. The method then proceeds back to step 402 to receive new commands from the client.

To illustrate the process of method 400, assume that the client is preparing to send the following structured query language (SQL) command set to the server:

| | SQL QUERY |
|---|---|
| 001 | s.prepareStatement("SELECT * FROM TABLE1 WHERE C1=? AND C2=? AND C3=?"); |
| 002 | s.setString(1,"value1"); |
| 003 | s.setString(2,"value2"); |
| 004 | s.setString(3,"value3"); |
| 005 | ResultSet rs=s.executeQuery( ); |

At line 001, the client instructs the server to prepare to perform an SQL that includes three parameters (C1, C2, C3) for the returned information. The client will supply the values for the three parameters. The first two parameters (C1, C2) are set in the setString statements in lines 002–003 and are sent to the server. The client then sends line 004, the final parameter (C3) to be set, to the server. Given this illustration, the server can make a prediction, after line 004 is received in the input buffer 114, that the execute statement in line 005 is going to be sent next by the client.

This is because in the structure of an SQL request command set, the preparation statement in line 001 defined that the statements in lines 002–004 would necessarily have to be sent to the server before an execution instruction. It also follows that the execute statement at line 005 would have to be sent by the client so that server may process the previous command set. The ability of the server to predict subsequent statements before receiving them is made possible by storing an appropriate command set in the command set database 112. In the present example, the command set data base 112 stores a command set reflecting the command set structure shown in lines 001–005. Thus, after each received statement or series of statements, the server can take predictive steps to anticipate the next statements(s).

In another embodiment, the client comprises a command set database 210, identical to the server command set database, to execute the prediction method 400 in parallel with the server. As an illustration, the server generates a predicted command set using method 400 based on commands received from the client and the client generates the same prediction using method 400 based on the commands it has sent to the server. Because the client is generating the same prediction as the server, the client does not send the remaining statements in a command set if the client determines that the prediction is correct. Since the client knows that the server has correctly anticipated the client's actions, the client is then free to process other data while waiting for the server to send the results. If the client receives an unpredicted result from the server, the client sends the complete command set request to the server along with a prediction unsuccessful flag. Upon receiving the prediction unsuccessful flag from the client, the server undoes the work performed when executing the wrongly predicted command set and executes the complete command set request sent by the client.

In still another embodiment, the server builds a database containing command sets commonly generated by a client's application. By keeping track of specific starting and ending points in what an application does, the server can predict that the pattern of server requests will hold for new requests. As an illustration, when the server receives the first statement in a command set sent to it by the client application, it compares the statement with the first statements in the built database of command sets. If a database command set has the identical first statement as the first statement sent by the client application, the server selects the database command set as the predicted behavior of the application. The server then executes the database command set.

To illustrate this embodiment, the following series of network setup calls are made by a user application before starting to send work to the server database system:

| Network Setup Calls | |
|---|---|
| 001 | Command 1 |
| 002 | Command 2 |
| 003 | Command 3 |
| 004 | Command 1 |
| 005 | Command 2 |
| 006 | Command 4 |
| 007 | Command 1 |
| 008 | Command 2 |
| 009 | Command 4 |
| 010 | Command 1 |

As an illustration of how the command set database is built, the server stores the first series of requests (Command 1 001, Command 2 002, and Command 3 003) in the input buffer 114. The next set of requests (Command 1 004, Command 2 005, and Command 4 006) are also stored in the input buffer 114. The server then compares these series of requests and notes that the sequence of receiving Command 2 has repeated sequentially after Command 1 was received. The server then blocks the sequence of Command 1 followed by Command 2 as a command set in the command set database. This command set represents a command set that is likely to repeat in future requests by the client. Thereafter, when the server receives Command 1, the server will perform a lookup in the command set database and find the blocked command set beginning with Command 1 and ending with Command 2. The server will then execute the command set consisting of Command 1 and Command 2.

In another embodiment, the server will wait for a predetermined repetition of commands before it blocks repetitive commands in the command set database. This is useful in situations where an application behaves differently at startup than after reaching a steady state. Referring back to the network call illustrated above, the application at startup first sends Command 1 001, Command 2 002, and Command 3 003. The next series of commands (Command 1 004 and Command 2 005) repeat the first two commands sent at startup (Command 1 001 and Command 2 002) and includes a new command (Command 4 006). In this embodiment, the server will not immediately block Command 1 and Command 2 as a repeating command set. The server may wait for a predetermined period until a series of commands have been sent at least twice before it blocks the commands as a repeating command set. In the next series of commands, the server notes that the series of commands, Command 1 007, Command 2 008 and Command 4 009 have repeated from a previous request and will block these three commands in the command set database if the predetermined wait period has been reached. Thereafter, when the client sends Command 1, the server will perform a lookup in the command set database and find the command set beginning with Command 1. The server will then execute all of the commands in the command set beginning with Command 1.

The present invention offers numerous advantages over conventional data transfer techniques. For example, the present invention allows a networking layer to intelligently decide when to do something on the user's behalf before the user actually requests the action and without requiring knowledge of the actual application that the end user is running. This solution fits well into the emerging world of distributed computing where the various system layers are not developed by the same company. Thus, for example, the present invention could be used in a Java Database Connectivity ("JDBC") driver for a tier-0 device (such as a personal digital assistant). These embodiments may be desirable because, even though the JDBC driver could still predict what the user is going to do given the series of events leading up to it. By acting on this prediction and being able to handle the small number of cases where the prediction is wrong, the JDBC driver could achieve significant performance gains.

Embodiments of the present invention are also desirable because they allow the server to perform processing tasks during network traversals and while other actions are going on within the client system. By increasing the parallelism of the computing processes in this way, the present invention makes a noticeable impact on performance from the end user's perspective. Those skilled in the art will appreciate that these client-side performance benefits may be particularly desirable when implemented, in whole or in part, on cellular phones, personal digital assistants, and other pervasive devices.

Although the present invention has been described in detail with reference to certain examples thereof, it may be also embodied in other specific forms without departing from the essential spirit or attributes thereof. Thus, the present invention may be used in other processes commonly performed by a client/server or distributed architecture in which the communication layer is based on a standard that follows uncommon patterns. Embodiments of the present invention may also utilize other information to help predict the client's requests, such as the end user's identity, the end user's location, and the client computer's device type, etc. In addition, embodiments may take advantage of other methods of generating the predicted client request, such as neural networks, fuzzy logic, and the like.

While the foregoing is directed to embodiments of the present invention, other and further embodiments of the invention may be devised without departing from the basic scope thereof, and the scope thereof is determined by the claims that follow.

What is claimed is:

1. A method for processing client requests at a server computer, comprising:
   receiving an initial portion of a client command from a client computer, wherein the client command comprises an initial portion and remaining portions of a database request; wherein the initial portion comprises a subset of a sequence of statements forming said database request;
   predicting what the next sequence of statements of the client command will be received based on the initial portion of the client command, prior to receiving the remaining portions of the client command from the client computer, wherein the remaining portions of the client command comprise at least one statement of said database request;
   executing said predicted sequence of statements of the client command; receiving the remaining portions of the client command from the client computer;
   determining whether the complete client command matches the predicted client command;
   if the complete client command matches the predicted client command, sending a result of executing the predicted client command to the client computer;
   predicting the client command at the client computer based on the initial portion of the client command sent to the server;
   determining, at the client computer, whether the complete client command matches the client's predicted command; and
   if not, sending the complete client command in its entirety along with a flag indicating an unsuccessful prediction from the client computer to the server computer.

2. The method of claim 1, wherein predicting the client command comprises determining a matching command for the initial portion of the client command and wherein executing the predicted client command comprises executing the matching command.

3. The method of claim 1, further comprising: if the complete client command does not match the predicted command, executing the complete client command as received from the client computer; and
   sending a result of executing the complete client command, as received from the client computer, to the client computer.

4. The method of claim 1, wherein predicting the client command at the client computer comprises determining a matching command for the portion of the client command by comparing a portion of the client command sent to the server computer with command sets in a database maintained at the client computer.

5. The method of claim 1, further comprising generating a database of repeated client commands wherein the repeated client commands are commands received at least twice by the server computer.

6. The method of claim 5, where the commands are received by the server for a predetermined number of repetitions.

7. A server computer configured for operable connection to a client computer, comprising:
   a command set database, wherein the command set database comprises sequence of statements of commands expected to be received from the client computer; and
   a processor configured to determine a predicted sequence of statements of a command from the command set database in response to receiving an initial portion of a client command from the client computer prior to receiving a remaining portion of the client command, wherein
   the client command comprises an initial portion and remaining portions of a database request;
   the initial portion comprises a subset of a sequence of statements forming said database request;
   the remaining portions of the client command comprises at least one statement of said database request;
   and the processor is further configured to receive, from the client computer, a complete command with a flag indicating a prediction of the client command performed at the client computer based on the initial portion of the client command was unsuccessful.

8. The server computer of claim 7, wherein the processor is configured to determine the predicted command by:

determining whether a matching command exists in the command set database for the portion of the command received in an Input memory area;

if so, executing the predicted command; and storing a result of executing the predicted command in an output memory area.

9. The server computer of claim 7, wherein the processor is configured to determine whether the predicted command is correct upon receiving a remaining portion of the client command.

10. The server computer of claim 9, wherein if the processor determines that the predicted command is not correct, the processor executes the client command, as received in its entirety from the client computer.

11. The server computer of claim 7, wherein the database comprises repeated commands, wherein the repeated commands are commands that repeat for a predetermined number of repetitions.

12. The server computer of claim 7, wherein the server computer and the client computer are connected through a network.

13. The server computer of claim 7, further comprising:
an input memory area to receive portions of commands from the client computer; and
an output memory area to store the results generated by executing at least one of predicted commands and commands received by the client computer.

14. A signal bearing medium, comprising a computer executable program which, when executed by a processor, performs a method, comprising:
receiving an initial portion of a client command from a client computer, wherein the client command comprises an initial portion and remaining portions of a database requests, wherein the initial portion comprises a subset of a sequence of statements forming said database request;
prior to receiving a remaining portion of the client command, predicting what the next sequence of statements of the client command will be received by determining whether a matching sequence of statements of a command exits for the received initial portion of the client command, wherein the remaining portions of the client command comprise at least one statement of said database request;
if so, executing the said matching command;
receiving the remaining portion of the client command from the client computer;
determining whether the complete client command, as received in its entirety, matches the predicted client command;
if the complete client command matches the predicted client command, sending a result of executing the predicted client command to the client computer; and
receive, from the client computer, the complete client command with a flag indicating a prediction of the client command performed at the client computer based on the initial portion of the client command was unsuccessful.

15. The signal bearing medium of claim 14, wherein determining whether a matching command exists for the received portion of the client command comprises comparing the received portion of the command to commands in a command set database.

16. The signal bearing medium of claim 14, wherein the method further comprises:

if the client command does not match the predicted command, executing the complete client command as received from the client computer, and
sending a result of executing the complete client command to the client computer.

17. The signal bearing medium of claim 14, wherein the method further comprises:
determining whether the result of executing the predicted command is correct; and
if not, sending a result of executing the complete client command to the client computer.

18. The signal bearing medium of claim 17, wherein determining whether the result of executing the predicted command is correct comprises:
determining, at the client computer, whether the complete client command matches the predicted command; and
if not, sending the complete client command from the client computer to the server.

19. The signal bearing medium of claim 18, wherein determining, at the client computer, whether the complete client command matches the predicted command comprises comparing the complete client command to entries in a database maintained at the client computer.

20. The signal bearing medium of claim 14, wherein the method further comprises generating a database of repeated client commands wherein the repeated client commands are commands received at least twice by the server computer.

21. The signal bearing medium of claim 20, where the repeated client commands are received for a predetermined number of repetitions.

22. A computer capable of being connected to a network through a network connection, comprising:
an input memory area to receive commands from a client computer connected to the network;
a command set database, wherein the command set database comprises sequence of statements of commands expected to be received by the client computer;
an output memory area to store results generated by executing commands received from the client; and
a processor configured to predict the next sequence of statements of a command from the command set database in response to receiving, in the input memory area, an initial portion of a client command from a client computer, prior to receiving remaining portions of the client command from the client computer wherein:
the client command comprises an initial portion and remaining portions of a database request;
the initial portion comprises a subset of a sequence of statements forming said database request;
the remaining portions of the client command comprise at least one statement of said database request;
and the processor is further configured to receive, from the client computer a complete command with a flag indicating a prediction of the client command performed at the client computer based on the initial portion of the client command was unsuccessful.

23. The server computer of claim 22, wherein the processor is configured to determine the predicted command by:
determining whether a matching complete command exists in the command set database corresponding to the portion of the command received in the input memory area;
if so, executing the predicted command; and
storing a result of executing the predicted command in the output memory area.

24. The server computer of claim 22, wherein the database comprises repeated commands, wherein the repeated commands are commands that repeat for a predetermined number of repetitions.

25. The server computer of claim 22, wherein the processor is configured to determine whether the predicted command is correct upon receiving a remaining portion of the client command.

26. The server computer of claim 25, wherein if the processor determines that the predicted command is not correct, the processor executes the client command, as received from the client computer.

27. The method of claim 1, wherein:
the client command comprises a set of statements forming a database request; and
receiving the portion of the client command from the client computer comprises receiving one or more, but not all, of the statements.

28. The server computer of claim 7, wherein:
the server computer comprises a database queryable by database requests received from the client computer;
the command set database comprises database requests expected to be received from the client computer; and
the processor is configured to determine predicted database request from the command set database in response to receiving one or more query statements forming a client database request.

* * * * *